(12) United States Patent
Bergman (10) Patent No.: US 7,204,497 B2
(45) Date of Patent: Apr. 17, 2007

(54) STEERING POST FOR RECREATIONAL VEHICLE

(75) Inventor: Ron Bergman, McIntosh, MN (US)

(73) Assignee: Arctic Cat, Inc., Thief River Falls, MN (US)

( * ) Notice: Subject to any disclaimer, the term of this patent is extended or adjusted under 35 U.S.C. 154(b) by 101 days.

(21) Appl. No.: 10/290,847

(22) Filed: Nov. 7, 2002

(65) Prior Publication Data

US 2004/0090031 A1    May 13, 2004

(51) Int. Cl.
*B62D 7/16* (2006.01)
*F16C 11/06* (2006.01)

(52) U.S. Cl. .................. 280/93.511; 180/190; 403/122

(58) Field of Classification Search ............... 180/190; 280/15, 16, 21.1, 87.021, 87.041, 93.511, 280/93.513, 771, 779, 780; 403/122, 135, 403/141, 142
See application file for complete search history.

(56) References Cited

U.S. PATENT DOCUMENTS

| | | | | | |
|---|---|---|---|---|---|
| 1,416,864 | A | * | 5/1922 | Parkes | 280/7.1 |
| 1,568,412 | A | * | 1/1926 | Parkes | 280/87.041 |
| 1,743,121 | A | * | 1/1930 | Edele | 280/240 |
| 1,877,332 | A | * | 9/1932 | Laisne | 280/93.511 |
| 1,931,102 | A | * | 10/1933 | Casper | 403/133 |
| 3,674,104 | A | * | 7/1972 | Gostomski | 180/190 |
| 3,825,086 | A | * | 7/1974 | Bombardier | 280/21.1 |
| 3,827,516 | A | * | 8/1974 | Lucia | 280/22.1 |
| 3,882,948 | A | * | 5/1975 | Southiere | 180/190 |
| 4,187,033 | A | * | 2/1980 | Zukowski | 403/137 |
| 4,307,788 | A | * | 12/1981 | Shelton | 180/181 |
| 4,509,766 | A | * | 4/1985 | Yasui et al. | 280/21.1 |
| 6,152,640 | A | * | 11/2000 | Oda et al. | 403/133 |
| 6,164,860 | A | * | 12/2000 | Kondo | 403/132 |
| 2002/0067021 | A1 | * | 6/2002 | Heringer et al. | 280/274 |
| 2004/0032120 | A1 | * | 2/2004 | Vaisanen et al. | 280/771 |

* cited by examiner

*Primary Examiner*—Paul N. Dickson
*Assistant Examiner*—Laura B. Rosenberg
(74) *Attorney, Agent, or Firm*—Black Lowe & Graham, PLLC (57) ABSTRACT

A steering post for use with a recreational vehicle, particularly a snowmobile or ATV, is described. The steering post includes a steering shaft having upper and lower ends; at least two steering arms, the two steering arms being positioned at an angle to a longitudinal axis of the steering shaft; a ball joint assembly positioned at the lower end of the steering shaft; and a stop. An upper bearing for supporting a steering post on a recreational vehicle may have a radiused inner surface that can accept some misalignment of the shaft. A steering system also can include a double ball joint linkage that permits an easier and simpler adjustment of the steering system. A recreational vehicle such as snowmobile or ATV making use of these features also is described.

22 Claims, 12 Drawing Sheets

STEERING POST FOR RECREATIONAL VEHICLE

FIELD OF THE INVENTION

This invention relates to a steering post for use with a recreational vehicle and; more particularly the invention relates to a steering post that is lighter in weight and provides less play for use with a recreational vehicle, particularly for a snowmobile or all terrain vehicle (ATV). The present invention also relates to a steering system that has fewer parts and provides a steering linkage that is easy to adjust.

BACKGROUND OF THE INVENTION

Snowmobiles are a widely used means of transportation in snowy regions. They are especially popular for recreational purposes such as trail riding or racing.

The typical snowmobile is propelled by a rear mounted endless rubber track powered by a gasoline engine and steered by two forward mounted skis. The driver turns the snowmobile using a set of handlebars mounted at the upper end of a steering post. The steering post is connected through an arm at its lower end which is a torque inducing component, such that as the torque is transmitted along the steering post from the handlebars, the torque is then transferred through the arm to the steering linkages of the steering system to turn the skis in synchronized fashion with respect to the drive track.

Typical steering posts utilize plastic bearings to help control rotation about the longitudinal axis. Snowmobiles are operated on a variety of terrains, including ice, snow, and snow and icy rutted trails. As such, looseness and play in the steering is undesirable. By replacing the bearings with a ball stud, a steering post that allows a tight bearing tolerance and less play is provided. Additionally, replacing the conventional bearings with a ball stud provides a steering post that is lightweight and that has an overall more efficient design. Similar considerations are applicable to wheeled all terrain vehicles and other recreational vehicles that use a pair of front steering members, e.g. skis or wheels, for steering the vehicle.

SUMMARY OF THE INVENTION

It is the purpose of the invention to provide a steering post for a recreational vehicle, particularly a snowmobile, having a lighter, more efficient design and tighter tolerance components, resulting in an overall tight control of the steering.

In an embodiment of the invention, a steering post for a recreational vehicle includes a steering shaft, at least at least one steering arm positioned at an angle to the longitudinal axis of the steering shaft, and a ball joint assembly.

In another embodiment of the invention, a steering post for a recreational vehicle further includes a stop. The stop has a central member having a first end spaced a distance apart from a second end. The first and second ends may include a screw. The stop also includes an upper stop member and a lower stop member.

In another embodiment of the invention, a ball joint assembly includes a housing having a cavity formed therein, a ball seat positioned inside the housing cavity, and a ball stud. The ball stud has a rounded head portion rotatably disposed within the ball seat and a screw portion extending out from the housing having an annular rib located bear the base of the rounded head of the ball stud and a plurality of external threads.

In a further embodiment of the invention, a snowmobile includes a chassis having a belt traction unit, a pair of forwardly mounted steerable skis, a front suspension system attaching the steerable skis to the chassis, and a steering post interconnected to the steerable skis. The steering post includes a steering shaft having upper and lower ends; at least one steering arm, the steering arm being positioned at an angle to a longitudinal axis of the steering shaft; and a ball joint assembly positioned at the lower end of the steering shaft. Preferably, the steering post includes two steering arms.

In a further embodiment, and upper bearing for a steering post has a radiused inner surface facing the steering post. This permits the bearing to accept some misalignment or changes in alignment of the steering post.

In a further embodiment, a steering system for a recreational vehicle such as a snowmobile includes a steering post linked to a first pivot member. The first pivot member is linked to a second pivot member. The first and second pivot members are linked to respective first and second steering members, e.g. skis or wheels. One end of the linkage between the first and second pivot members and one end of the linkage between the first pivot member and the first steering member are mounted to the first pivot member at a common point. The other end of the linkage between the first and second pivot members and one end of the linkage between the second pivot member and the second steering member are mounted to the first pivot member at a common point.

A variety of additional advantages of the invention will be set forth in part in the description which follows, and in part will be obvious from the description, or may be learned by practice of the invention. It is to be understood that both the foregoing general material and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts. It should be noted that throughout the description, the terms "including" and "having" are used synonymously with "comprising".

Figure 1:
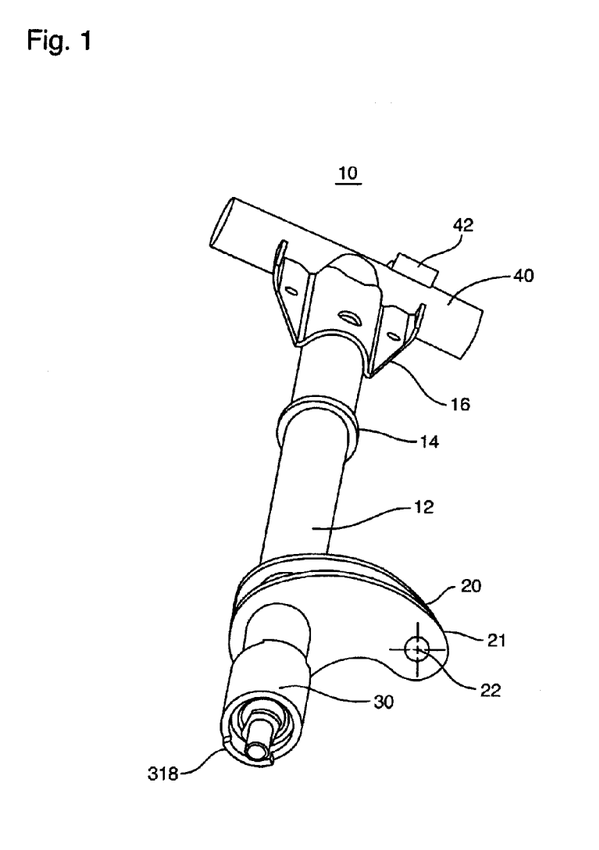
FIG. 1 is a perspective view of an embodiment of the present invention.
Figure 2A:
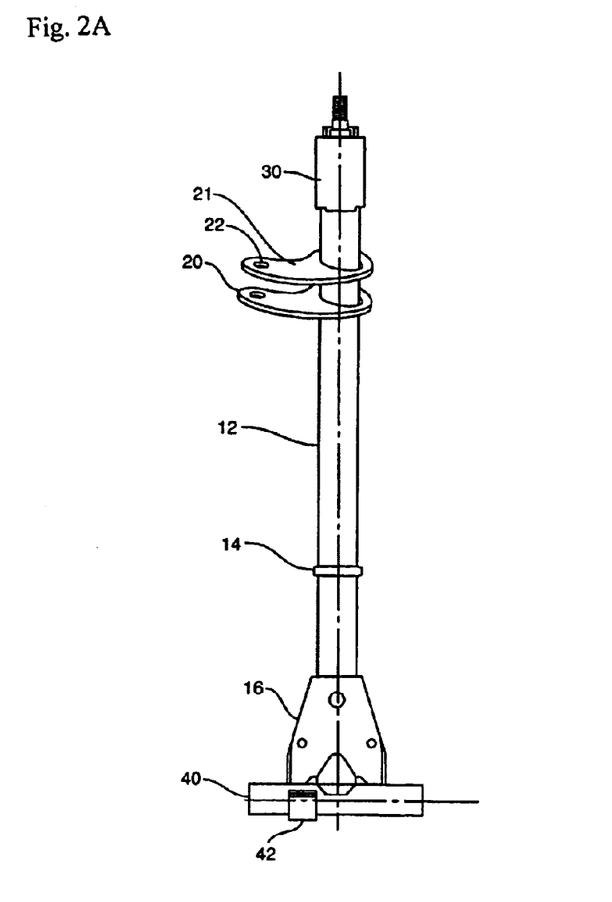
FIG. 2a is a rear view of an embodiment of the present invention.
Figure 2B:
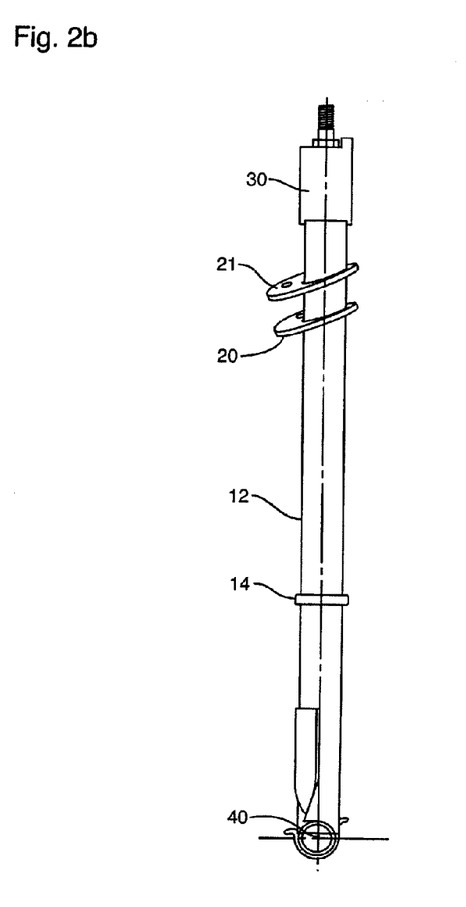
FIG. 2b is a side view of an embodiment of the present invention.

Referring now to the drawings, FIGS. 1, 2a and 2b depict a steering post 10. The steering post 10 is particularly suited for use with a snowmobile, but could be adapted for use with other recreational vehicles, such as an all terrain vehicle (ATV). In the illustrated embodiment depicted in FIG. 1, 2a, and 2b, the steering post includes a steering shaft 12, at least one steering arm 20, 21, a ball joint assembly 30, and a handlebar tube 40. Preferably, the steering post includes two steering arms 20, 21 as shown in FIG. 1.

The steering shaft 12 may be a hollow tube having a first end and a second end. Typically, the steering shaft 12 is machined metal.

Located near the first end of the steering shaft 12 is a collar 14. Typically, the collar 14 is manufactured as a separate piece and secured onto the steering shaft 12 by welding or another suitable method, although it might be possible to form the collar integrally with the shaft.

Also located near the first end of the steering shaft 12 is a handlebar support tube 40. The handlebar support tube 40 may be supported by a gusset 16. The handlebar support tube 40 may be hollow, as depicted in FIG. 2b, and has at least one handlebar stop 42 located thereon.

Figure 6:
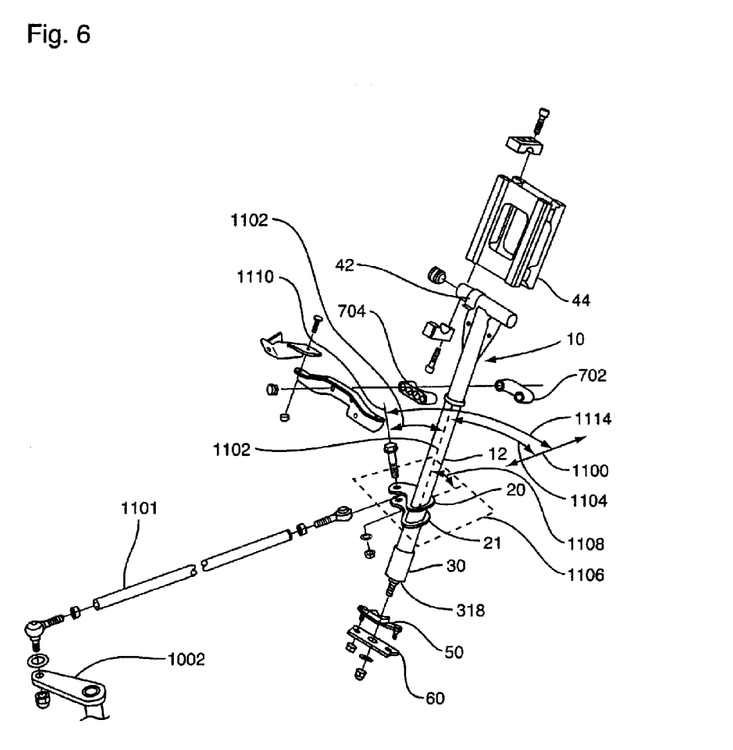
FIG. 6 is an exploded perspective view of part of a steering system in an embodiment of the invention.
Figure 9:
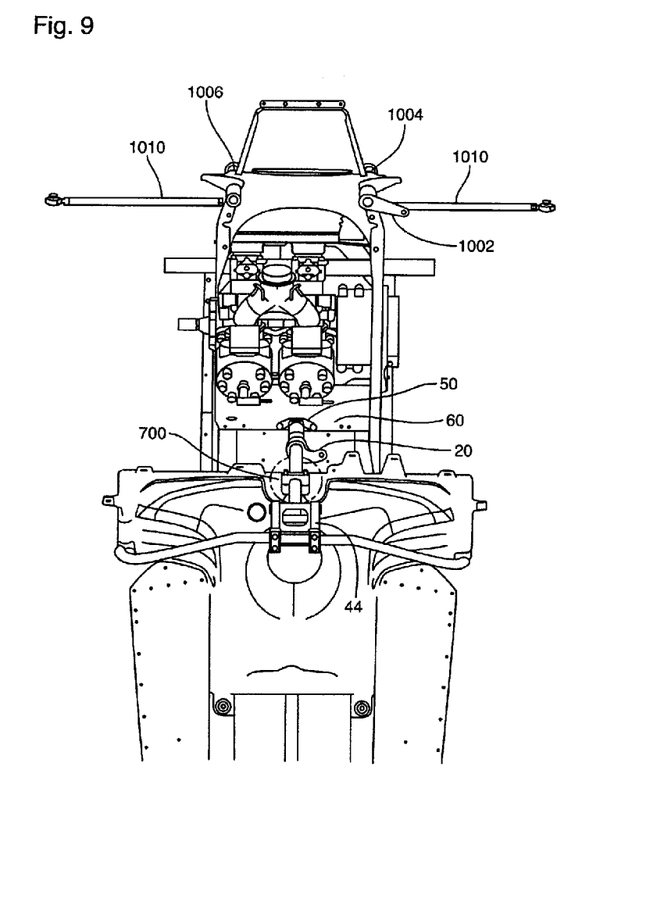
FIG. 9 is a top view illustrating the overall configuration of a steering system in an embodiment of the present invention.

A handlebar riser or mount 44 is mounted to the handlebar tube (see FIG. 6 and FIG. 9—the handlebars themselves are omitted in FIG. 6). The rider manipulates the handlebars in order to maneuver the vehicle. Torque is transmitted from the handlebars along the steering shaft 12 and then, transferred to a steering system through a steering arm to turn the skis in a synchronized fashion with respect to the drive track.

Secured near the second end of the steering shaft 12 is at least one steering arm 20, 21. The steering arm(s) typically is made of metal and may be secured to the steering shaft by any suitable method, such as welding. The steering arm(s) each may comprise an aperture 22 for accommodating a pin, screw, or another fastening means therein so that the steering arms can be connected to a linking member (see FIG. 6). The steering arms 20, 21 desirably are positioned parallel to one another such that their apertures are aligned.

As shown in FIG. 2b, the steering arms 20, 21 also may be positioned at an angle to a longitudinal axis of the steering shaft. This can keep the transfer arm 1001 (discussed below with respect to FIG. 6) at a more desirable angle relative to other elements of the steering system, e.g. the pivot member 1002. The positioning angle of the steering arms 20, 21 relative to the shaft generally will be less than or equal to 65.5°.

FIGS. 1, 2a, and 2b also show a ball joint assembly 30 located near the second end of the steering shaft 12. The ball joint assembly 30 is welded or secured by another suitable means to the second end of the steering shaft. The connection between the welded ball joint assembly 30 and the steering shaft generally is expected to withstand at least a 275 FT/LBS torsional load without failure for practical use.

Figure 3:
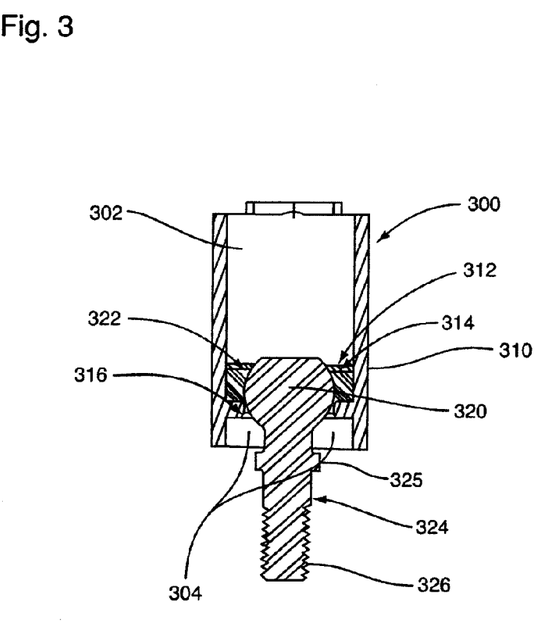
FIG. 3 is a cross-sectional view of the ball joint assembly 30 shown in FIG. 1.

FIG. 3 is a cross-sectional view of the ball joint assembly 30 as shown in FIG. 1. As depicted in FIG. 3, the ball joint assembly 30 includes a housing 300 having a cavity 302 formed therein, a ball seat 310 positioned inside the housing cavity 302, and a ball stud 320. The ball seat 310 includes a positioning member 312, a race 314, and a retainer 316. In the depicted embodiment, the retainer 316 is a chamfer. The positioning member 312 may be, but is not limited to, one of the following: snap ring, crimp, wedge stake, washer, or screw-in ring. In the depicted embodiment, the positioning member 312 is a washer. The positioning member 312, race 314, and retainer 316 of the ball seat 310 are used to position the ball stud 320 in the ball seat 310. The ball stud 320 includes a rounded head portion 322 and a threaded member 324. The threaded member 324 may have an annular rib 325 located near the base of the rounded head portion 322 of the ball stud 320 and a plurality of threads 326. The threaded member 324 may be externally or internally threaded. The ball stud is rotatable relative to the housing 300.

Figure 4:
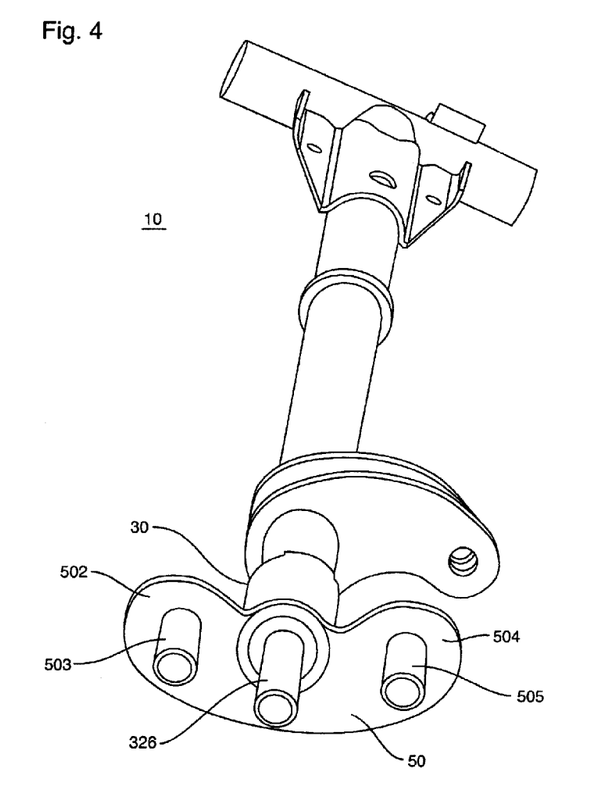
FIG. 4 is a perspective view of an embodiment of the invention.

Illustrated in FIG. 4 is a steering post 10 including a stop 50. The stop 50 is located at the second end of the steering shaft 12 and accepts the screw portion 326 of the ball joint assembly 30 so that relative rotation between the stop and the housing of the ball joint is permitted. The stop 50 has a first end 502 and a second end 504. Each end may have an aperture 512, 514 formed therein (best viewed in FIG. 5). The apertures of the first and second ends 502, 504 each may have a screw 503, 505 or another fastener secured therein, for example by welding, which permit the stop to be secured to the vehicle.

Figure 5:
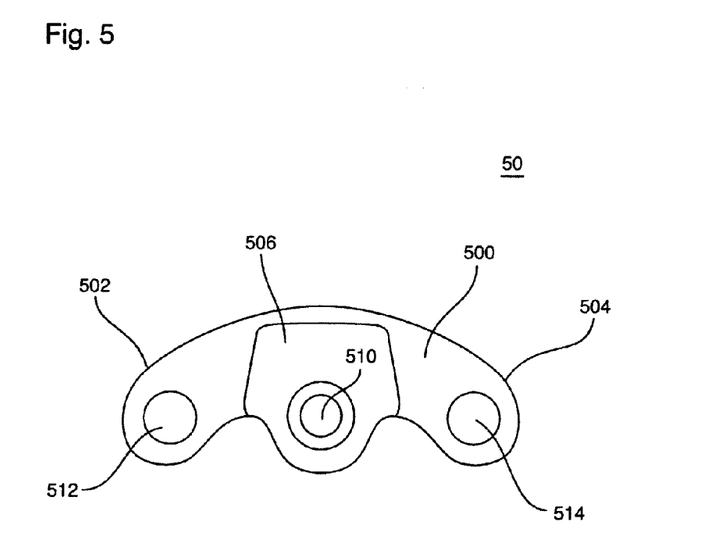
FIG. 5 is a top view of the stop 50 depicted in FIG. 4.

FIG. 5 is a detailed view of the stop 50 shown in FIG. 4. The stop 50 includes a central member 500 having a first end 502 spaced a distance apart from a second end 504; and a raised stop member 506. The central member 500 and the stop member 506 have an aperture 510 formed therein, which can accept the threaded portion 326 of the ball stud 320 of the ball joint assembly 30 (shown in FIG. 4) securing the steering post 10 to the vehicle. The raised stop member 506 engages a stop member 318 (see FIG. 1) on the housing of the ball joint during rotation of the steering post, thereby limiting the amount of rotation of the steering post.

FIG. 6 illustrates a steering post 10 including a stop 50 secured to a suitable portion of the vehicle body 60. The vehicle is preferably a snowmobile, although the steering post of the invention may be used for other types of vehicles. While FIG. 6 shows a cap for the handlebar support tube and various fasteners, such as that for the riser 44, on one side, it will be appreciated that such items will be provided on both sides.

Figure 7A:
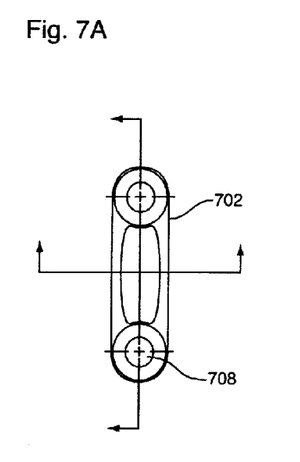
FIGS. 7A is a first end view of an upper bearing that can be used to support a steering post, with FIG. 7B being a partial cross sectional view showing a radiused inner surface of the bearing, FIG. 7C being a longitudinal cross section and FIG. 7D being a second end view.
Figure 7B:
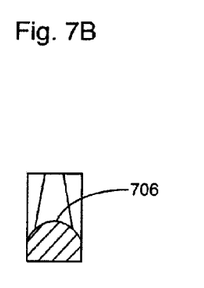
Figure 7C:
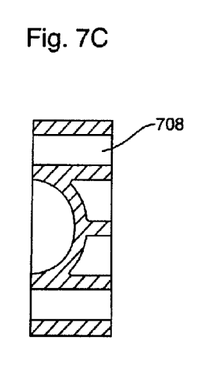
Figure 7D:
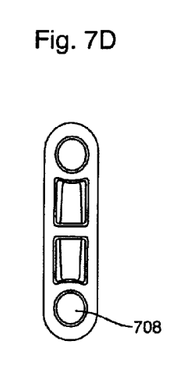
Figure 8:
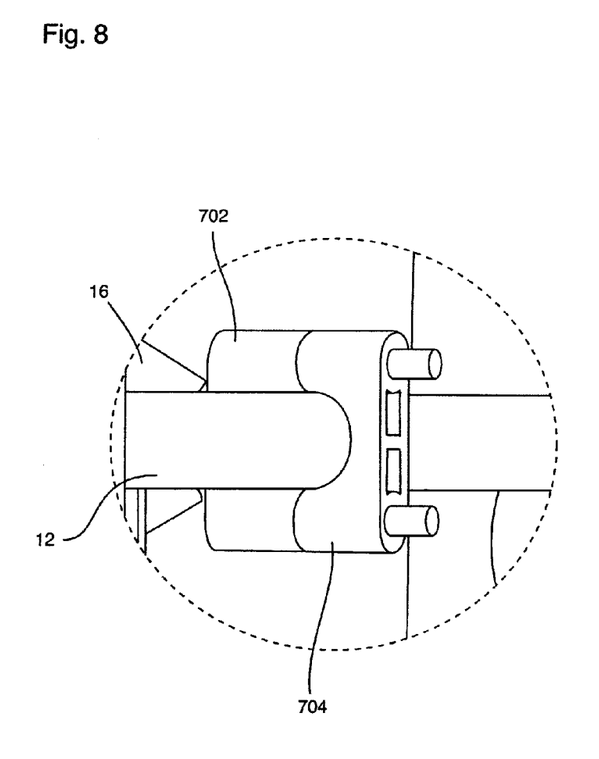
FIG. 8 is a perspective view showing the installed bearing.

FIGS. 7A–D and 8 illustrate an upper bearing 700 that can be used to secure the upper end of the steering post to the vehicle such as a snowmobile. The upper bearing may have a two-piece structure, for example being formed of pieces 702 and 704. The inner surface 706 of the bearing, i.e. the surface that faces the steering post, is radiused, as seen in FIG. 7B. This is advantageous in that the bearing can accommodate some angular misalignment of steering post while still holding the steering post securely and permitting the rotation of the steering post. The upper bearing 700 may be formed of molded plastic or other suitable material having a sufficiently low coefficient of friction relative to the steering post. The radius on the inner surface of the bearing may vary, but a radius of about 0.5 inches (about 1.3 cm) is suitable for use in a snowmobile.

The upper bearing may be mounted to the vehicle in any suitable manner. In the illustrated embodiment, two longitudinal apertures extend through the body of the bearing, e.g.

the two through holes 708 seen in FIGS. 7A, C and D. These can accept a pair of pins provided on the vehicle. In the illustrated embodiment, these pins are provided on an upper portion of the vehicle fuel tank (see FIG. 9), and can be molded into the fuel tank when the fuel tank is made of a molded plastic material. The upper bearing can be secured to the pins with threaded nuts or other suitable fasteners, and an additional support plate can be provided on the outer side of the bearing.

Figure 10:
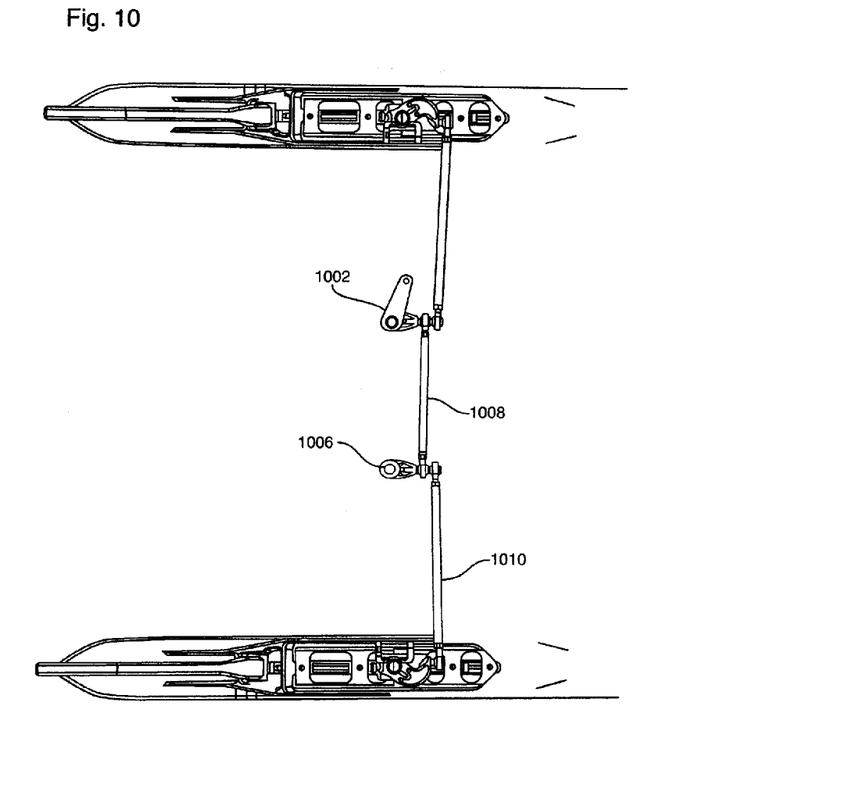
FIG. 10 is a top view of part of the steering system of FIG. 9.
Figure 11:
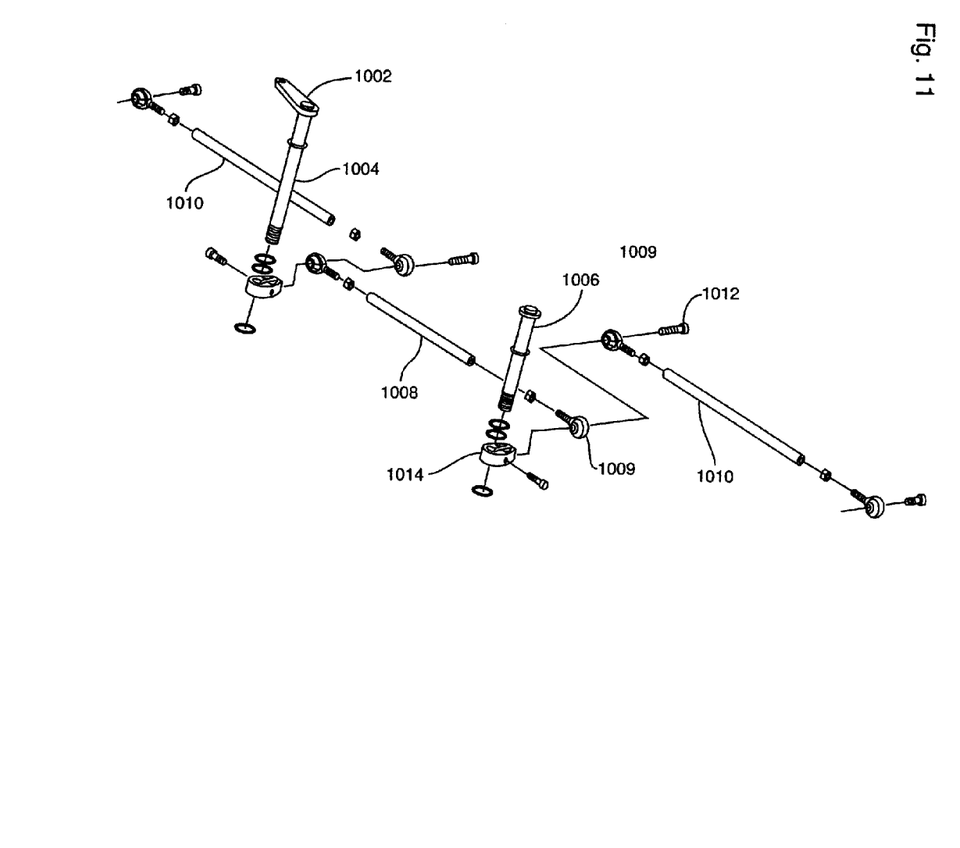
FIG. 11 is an exploded view thereof.

Referring to FIGS. 9–11, a system for imparting movement to skis of a snowmobile will be described. In the case of another type of recreational vehicle, wheels or other steering members may be present instead of skis. The steering arms 20, 21 are connected to a first transfer arm 1001, which in turn is connected to a first pivot member 1002 (FIG. 10). The first transfer arm acts as a linking member between the steering post and the first pivot member, and imparts rotation of the steering post to the first pivot member. The first pivot member includes an arm secured to a shaft 1004 that is carried for rotational movement on the vehicle. A second pivot member 1006, which likewise has a shaft carried for rotational movement, is connected to the pivot member 1002 by a second transfer arm 1008, so that the rotation of the first pivot member 1002 is imparted to the second pivot member 1006. The respective first and second assemblies are connected to the skis, which are pivotably mounted to the snowmobile, through third transfer arms 1010.

Thus, the rotation of the steering post is imparted to the first pivot member through the first transfer arm. The rotation of the first pivot member is imparted essentially simultaneously to the second pivot member through the second transfer arm, while the rotation of the first pivot arm member and second pivot member is imparted to the skis, while maintaining a synchronized parallel relationship, by the third transfer arms.

The second and third transfer arms are secured to the first pivot member and second pivot member respectively at a common location. For example, as seen in FIGS. 10 and 11, one end of the second transfer arm and a first end of one of the third transfer arms are mounted on a single pin associated with the first pivot member, while the other end of the second transfer arm and a first end of the other of the third transfer arms are mounted on a single pin associated with the second pivot member. As shown in FIG. 11, the pins 1012 can be threaded and screwed into a threaded aperture that is provided in a sleeve 1014 secured to the shaft of the respective pivot member.

The ends of the transfer arms can be adapted to accept changes in the angular relationship between the elements to which they are attached. In this regard, in the illustrated embodiment the ends of the first, second and third transfer arms include apertured ball members rotatably carried in a sleeve member 1009. The apertured ball member closest to the head of the pins 1012 may be countersunk to accept the head, thereby reducing the tendency for the head to inhibit the range of motion of the sleeve member that carries that ball member. Also, by mounting the sleeve members to the transfer arms with threads, the effective length of the transfer arms can be adjusted by rotating the sleeve members. A nut (as illustrated) or similar device can be used to fix the sleeves in the desired positions. This allows the adjustment of the transfer arms while reducing or eliminating the adjustment needed for other members of the steering system.

Referring again to FIG. 6, a vehicle, such as is illustrated in FIG. 9 typically has a direction of travel 1100. As is apparent in FIGS. 6 and 9, the steering shaft 12 has a longitudinal axis 1102 that is at a non-perpendicular angle 1104 relative to the direction of travel 1100. It is also apparent that the steering arms 20, 21 are substantially planar in one embodiment having the plane 1106 of constant thickness are at a non-perpendicular angle 1108 relative to the longitudinal axis 1102 of the steering shaft 12. Apertures 22 formed in the one or more steering arms 20, 21 are aligned along an axis 1110 that is at a non-perpendicular and non-parallel angle 1112 relative to the longitudinal axis 1102 of the steering shaft. The axis 1110 is also the axis of symmetry of the circular apertures 22. The axis 1110 is at a substantially perpendicular angle 1114 to the direction of travel 1100.

It is to be understood that while certain embodiments of the present invention have been illustrated and described, the invention is not limited to the specific forms or arrangements of the parts described and shown, and that the specification and depicted embodiment is to be considered exemplary only, with the true scope and spirit of the invention being indicated by the broad meaning of the following claims.

I claim:

1. A steering post for a recreational vehicle having a forward direction of travel, the steering post comprising:
    a) a steering shaft comprising a first end proximal to a user's position, a second end, and a longitudinal axis extending therebetween;
    b) at least one steering arm secured to the steering shaft and configured for transmitting rotation from the steering shaft to a steering system, wherein the steering arm is positioned at a substantially non-perpendicular angle relative to the longitudinal axis of the steering shaft; and
    c) a ball joint assembly positioned at the second end of the steering shaft, the ball joint assembly comprising:
        a housing, wherein the housing comprises a cavity formed therein;
        a ball seat positioned inside the housing cavity; and
        a ball stud comprising a rounded head portion rotatably disposed within the ball seat and a threaded portion that extends in a direction away from the steering shaft, wherein the ball stud is coupled to the steering shaft through the ball seat and housing.

2. The steering post according to claim 1, wherein the threaded portion comprises an annular rib located near a base of the rounded head portion and a plurality of threads.

3. The steering post according to claim 1, wherein the threaded portion comprises a plurality of external threads.

4. The steering post according to claim 1, wherein the ball seat comprises a positioning member, the positioning member positioning the rounded head of the ball stud in the ball seat.

5. The steering post according to claim 1, wherein the ball seat comprises a race, the race positioning the rounded head of the ball stud in the ball seat.

6. The steering post according to claim 1, wherein the ball seat comprises a groove formed therein, the groove positioning the rounded head of the ball stud in the housing cavity.

7. The steering post according to claim 1, wherein the at least one steering arm comprising an aperture for accommodating a fastener therein.

8. The steering post according to claim 1, wherein two steering arms are present, each steering arm having an aperture for accommodating a fastener therein, and the two steering arms being positioned parallel to one another such that their apertures are aligned.

9. The steering post according to claim 1 further comprising a stop, the stop being adapted to be secured to a vehicle and to permit relative rotation with the ball joint assembly, the stop comprising a stop member capable of engaging the ball joint upon rotation of the steering post.

10. The steering post according to claim 9, wherein the stop is provided with an aperture that accepts the threaded member of the ball stud carried by the ball joint.

11. The steering post according to claim 1, wherein the steering post further comprises a handlebar tube positioned at an upper end of the steering shaft.

12. The steering post according to claim 11, wherein the handlebar tube further comprises at least one handlebar stop.

13. The steering post according to claim 1, wherein the steering post further comprises a collar.

14. The steering post according to claim 1, wherein the steering post further comprises a gusset.

15. The steering post according to claim 14, wherein the gusset supports a handlebar tube.

16. The steering post according to claim 1, wherein the angle of the the forward direction of travel to the longitudinal axis of the steering shaft is not greater than 65.5°.

17. The steering post according to claim 1, wherein the ball joint assembly is welded to the second end of the steering shaft.

18. The steering post according to claim 17, wherein the welded ball joint assembly can withstand at least a 275 FT/LBS torsional load without failure.

19. A steering post for a recreational vehicle, comprising:
a steering shaft comprising a first end proximal to a user's position and a second end;
at least one steering arm for transmitting rotation from the steering shaft to a steering system, wherein the steering arm is positioned at a substantially non-perpendicular angle relative to a longitudinal axis of the steering shaft; and
a ball joint assembly positioned at the second end of the steering shaft, the ball joint assembly comprising:
a housing having a cavity formed therein;
a ball seat positioned within the housing cavity; and
a ball stud including a rounded head portion rotatably disposed within the ball seat and a threaded portion that extends in a direction away from the steering shaft, wherein the ball stud is coupled to the steering shaft through the ball seat and housing.

20. A steering post for a recreational vehicle having a forward direction of travel, the steering post comprising:
a steering shaft comprising a first end proximal to a user's position and a second end, the steering shaft being rotatable about a longitudinal axis of the steering shaft, the longitudinal axis being at a non-perpendicular angle relative to the direction of travel;
at least one steering arm secured to the steering shaft and configured for transmitting rotation from the steering shaft to a steering system of the vehicle, wherein the steering arm extends in a plane substantially parallel to the forward direction of travel; and
a ball joint assembly secured to the second end of the steering shaft, the ball joint assembly being secured to a body of the vehicle to fix an axial position of the second end of the steering shaft while permitting rotation of the steering shaft about the longitudinal axis, the ball joint assembly comprising:
a housing, wherein the housing comprises a cavity formed therein; and
a ball stud including a rounded head portion rotatably disposed within the cavity and a connection shaft that extends in a direction away from the steering shaft.

21. The steering post of claim 20, wherein the steering arm defines a coupling aperture having an axis of symetery substantially perpendicular to the forward direction of travel.

22. The steering post of claim 21, wherein the steering arm comprises a plate of uniform thickness, having a direction of uniform thickness substantially perpendicular to the forward direction of travel.

* * * * *